United States Patent
Tamakoshi et al.

(10) Patent No.: US 9,859,592 B2
(45) Date of Patent: Jan. 2, 2018

(54) POWER STORAGE APPARATUS AND METHOD OF OPERATING POWER STORAGE APPARATUS

(71) Applicant: NGK Insulators, Ltd., Nagoya-Shi (JP)

(72) Inventors: Tomio Tamakoshi, Kasugai (JP); Tetsuya Hatta, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 390 days.

(21) Appl. No.: 14/316,979

(22) Filed: Jun. 27, 2014

(65) Prior Publication Data

US 2014/0308545 A1 Oct. 16, 2014

Related U.S. Application Data

(63) Continuation of application No. PCT/JP2012/079481, filed on Nov. 14, 2012.

(30) Foreign Application Priority Data

Jan. 24, 2012 (JP) ................. 2012-011800

(51) Int. Cl.
*H01M 10/39* (2006.01)
*H01M 10/48* (2006.01)
(Continued)

(52) U.S. Cl.
CPC ..... *H01M 10/502* (2013.01); *H01M 10/3909* (2013.01); *H01M 10/486* (2013.01);
(Continued)

(58) Field of Classification Search
CPC ............... H01M 10/52; H01M 10/486; H01M 10/6563; H01M 10/613; H01M 10/3909
See application file for complete search history.

(56) References Cited

U.S. PATENT DOCUMENTS 3,837,918 A * 9/1974 Nakabayashi .... H01M 10/3909 429/104
4,383,013 A * 5/1983 Bindin ............. H01M 10/3909 429/104
(Continued)

FOREIGN PATENT DOCUMENTS

CN 101978549 A 2/2011
FR 2720860 A1 * 12/1995 ........ H01M 10/6563
(Continued)

OTHER PUBLICATIONS

International Search Report (Application No. PCT/JP2012/079481) dated Dec. 25, 2012.
(Continued)

*Primary Examiner* — Rena D Cronin
(74) *Attorney, Agent, or Firm* — Burr & Brown, PLLC (57) ABSTRACT

A battery chamber is formed inside a sealed container. A module battery and a charging/discharging path outside a battery are housed in the battery chamber. In the module battery, an electric cell chamber and an air chamber are formed inside a heat-insulating container. The electric cell chamber and the air chamber are divided by a heat transfer wall. An electric cell of a sodium-sulfur battery, and a charging/discharging path inside a battery are housed in the electric cell chamber. An intake path starts from outside of the sealed container and leads to the air chamber. An exhaust path starts from the air chamber and leads to the sealed container. The blower generates an air flow that sequentially flows through the intake path, the air chamber and the exhaust path. In a case where the cooling of the electric cell chamber is required, the air flow is generated.

7 Claims, 5 Drawing Sheets

(51) Int. Cl.
- *H01M 10/655* (2014.01)
- *H01M 10/6563* (2014.01)
- *H01M 10/627* (2014.01)
- *H01M 2/10* (2006.01)
- *H01M 10/63* (2014.01)
- *H01M 10/613* (2014.01)

(52) U.S. Cl.
CPC ....... *H01M 10/613* (2015.04); *H01M 10/655* (2015.04); *H01M 10/6563* (2015.04); *H01M 2/1088* (2013.01); *H01M 10/627* (2015.04)

(56) References Cited

U.S. PATENT DOCUMENTS

| | | | | |
|---|---|---|---|---|
| 4,522,898 | A * | 6/1985 | Esrom | B60L 11/1875 429/120 |
| 2006/0001399 | A1* | 1/2006 | Salasoo | B60K 6/28 320/104 |
| 2007/0171614 | A1* | 7/2007 | Pedoeem | H04L 12/18 361/695 |
| 2008/0220319 | A1* | 9/2008 | Takagi | H01M 2/1077 429/82 |
| 2010/0089547 | A1* | 4/2010 | King | B60L 3/0046 165/42 |
| 2010/0136449 | A1* | 6/2010 | Yanase | H01M 8/04089 429/432 |
| 2010/0156355 | A1* | 6/2010 | Bauerle | B60L 3/003 320/145 |
| 2010/0275619 | A1* | 11/2010 | Koetting | H01M 10/613 62/79 |
| 2011/0020676 | A1 | 1/2011 | Kurosawa | |
| 2011/0244293 | A1* | 10/2011 | Khalighi | H01M 10/4207 429/120 |
| 2012/0021303 | A1* | 1/2012 | Amendola | H01M 4/42 429/406 |
| 2013/0295428 | A1 | 11/2013 | Hatta et al. | |

FOREIGN PATENT DOCUMENTS

| | | | |
|---|---|---|---|
| JP | 59-171476 A1 | 9/1984 | |
| JP | 2000-48857 | * 2/2000 | ............ H01M 10/39 |
| JP | 2004-047208 A1 | 2/2004 | |
| JP | 2008-226488 A1 | 9/2008 | |
| WO | 2012/105137 A1 | 8/2012 | |

OTHER PUBLICATIONS

Chinese Office Action (Application No. 201280065509.3) dated Oct. 10, 2015.
International Preliminary Report on Patentability (Application No. PCT/JP2012/079481) dated Aug. 7, 2014 (with English translation).

* cited by examiner

POWER STORAGE APPARATUS AND METHOD OF OPERATING POWER STORAGE APPARATUS

TECHNICAL FIELD

The present invention relates to a power storage apparatus and a method of operating a power storage apparatus.

BACKGROUND ART

A sodium-sulfur battery (NaS battery) operates at a high temperature. Therefore, in the NaS battery, electric cells, a heater, and the like are housed inside a container (heat-insulating container), and the temperature of the inside of the container is maintained at a high temperature, as shown in Patent Document 1. However, as mentioned in Paragraph 0010 of Patent Document 1, it is not preferable that the temperature of the inside of the container excessively rises, and therefore heat is exhausted from the inside of the container to the outside as necessary.

On the other hand, in a power storage apparatus (power storage compensation apparatus) provided with a NaS battery, a battery (module battery) in which electric cells are housed inside a container is sometimes further housed in an unsealed container (package), as shown in Patent Document 2. Heat exhausted from the inside of the container to the outside is exhausted from the inside of the unsealed container to the outside by an air flow that passes inside the unsealed container.

As mentioned in Paragraph 0037 of Patent Document 2, in a case where the power storage apparatus is installed in an area where salt damage may occur, a salt-resistant filter is installed on an intake port of the unsealed container in order to prevent salt damage.

PRIOR ART DOCUMENT

Patent Document

Patent Document 1: Japanese Patent Application Laid-Open No. 2004-47208
Patent Document 2: Japanese Patent Application Laid-Open No. 2008-226488

SUMMARY OF INVENTION

Problems to be Solved by the Invention

However, in the invention of Patent Document 2, a cost for replacing the salt-resistant filter is increased. In a case where a battery is housed in a sealed container, the salt-resistant filter is not required, but an air conditioner that cools the inside of the sealed container is required in order to maintain the temperature of the inside of the sealed container at an appropriate temperature, and an operating cost and a maintenance cost of the air conditioner are increased. Particularly, in a case where the temperature of the outside air is high, necessary power is increased such that the temperature of an object housed inside the sealed container is not made higher than an allowable upper limit temperature.

The present invention is conceived in order to solve these problems. An object of the present invention is to provide a power storage apparatus, in which an operation cost and a maintenance cost are not increased, and the temperature of the inside is appropriately maintained, the power storage apparatus being not easily affected by outside air such as salt damage.

Means for Solving the Problems

The present invention is directed to a power storage apparatus.

In a first aspect of the present invention, a battery, a charging/discharging path outside a battery, a sealed container, an intake path formation, an exhaust path formation, a generation mechanism, a determination unit, and a generation control unit are provided in a power storage apparatus.

The battery includes a container, an electric cell of a sodium-sulfur battery, and a charging/discharging path inside a battery.

The container includes an outer wall and a heat transfer wall. An electric cell chamber and an air chamber are formed inside the container. The heat transfer wall divides the electric cell chamber and the air chamber. The electric cell and the charging/discharging path inside a battery are housed in the electric cell chamber.

The charging/discharging path outside a battery, and the charging/discharging path inside a battery are electrically connected to each other.

The sealed container houses the battery, and the charging/discharging path outside a battery.

An intake path formed in the intake path formation starts from outside of the sealed container and leads to the air chamber.

An exhaust path formed in the exhaust path formation starts from the air chamber and leads to outside of the sealed container.

The generation mechanism generates an air flow which sequentially flows through the intake path, the air chamber, and the exhaust path.

The determination unit determines whether or not cooling of the electric cell chamber is required.

The generation control unit controls the generation mechanism such that the air flow is generated in a case where the cooling of the electric cell chamber is required, and the air flow is not generated in a case where the cooling of the electric cell chamber is not required A second aspect of the present invention further adds a matter to the first aspect of the present invention.

In the second aspect of the present invention, a first temperature sensor is provided in the battery. The first temperature sensor is housed in the electric cell chamber. The determination unit determines that the cooling of the electric cell chamber is required, in a case where rising of a temperature measured by the first temperature sensor is a reference or more.

A third aspect of the present invention further adds a matter to the second aspect of the present invention.

In the third aspect of the present invention, a second temperature sensor and a flow rate control unit are provided in the power storage apparatus.

The second temperature sensor is arranged outside the sealed container.

The flow rate control unit controls the generation mechanism such that a flow rate of the air flow is increased as a temperature measured by the second temperature sensor rises.

A fourth aspect of the present invention further adds a matter to any of the first to third aspects of the present invention. In the fourth aspect of the present invention, a heat insulator is further provided in the battery.

The heat insulator and the air chamber face with each other with an outer wall interposed therebetween.

A fifth aspect of the present invention further adds a matter to any of the first to fourth aspects of the present invention. In the fifth aspect of the present invention, an accessory is provided in the power storage apparatus.

A battery chamber and an accessory chamber are formed inside the sealed container. The battery is housed in the battery chamber. The accessory is housed in the accessory chamber.

The sealed container includes a partition wall. The partition wall divides the battery chamber and the accessory chamber.

The sixth aspect of the present invention further adds a matter to the fifth aspect of the present invention. In the sixth aspect of the present invention, the exhaust path does not pass through the accessory chamber.

The seventh aspect of the present invention further adds a matter to any of the first to sixth aspects of the present invention. In the seventh aspect of the present invention, the two or more electric cells are arranged in a direction parallel to the air chamber.

The present invention is also directed to a method of operating a power storage apparatus.

Effects of the Invention

According to the first aspect of the present invention, an operation cost and a maintenance cost are not increased.

In a case where the cooling of the electric cell chamber is required, heat is exhausted from the electric cell chamber to the outside of the sealed container by the air flow. In a case where the cooling of the electric cell chamber is not required, the thermal insulation property of the container is improved. The temperature of the electric cell chamber is appropriately maintained.

Exhaust from the electric cell chamber to the battery chamber is suppressed. The temperature of the battery chamber is appropriately maintained.

Outside air does not easily enter a space other than the intake path, the air chamber, and the exhaust path. The influence of the outside air is suppressed.

According to the second aspect of the present invention, heat is exhausted from the electric cell chamber to the outside of the sealed container in a case where the temperature of the electric cell chamber rises. The temperature of the electric cell chamber is appropriately maintained.

According to the third aspect of the present invention, even in a case where the temperature of outside air is high, the exhaust capacity of heat from the electric cell chamber to the outside of the sealed container is maintained. The temperature of the electric cell chamber is appropriately maintained.

According to the fourth aspect of the present invention, heat transfer from the electric cell chamber to the inside of the sealed container is suppressed. The temperature of the inside of the sealed chamber is appropriately maintained.

According to the fifth aspect of the present invention, heat transfer from the battery chamber to the accessory chamber is suppressed. The temperature of the accessory chamber is appropriately maintained.

According to the sixth aspect of the present invention, heat transfer from the exhaust path to the accessory chamber is suppressed. The temperature of the accessory chamber is appropriately maintained.

According to the seventh aspect of the present invention, the heat of the two or more electric cells are uniformly radiated, and dispersion in the two or more electric cells is not easily caused.

These and other objects, features, aspects and advantages of the present invention will become more apparent from the following detailed description of the present invention when taken in conjunction with the accompanying drawings.

DESCRIPTION OF EMBODIMENT (Components of Power Storage Apparatus)

Figure 1:
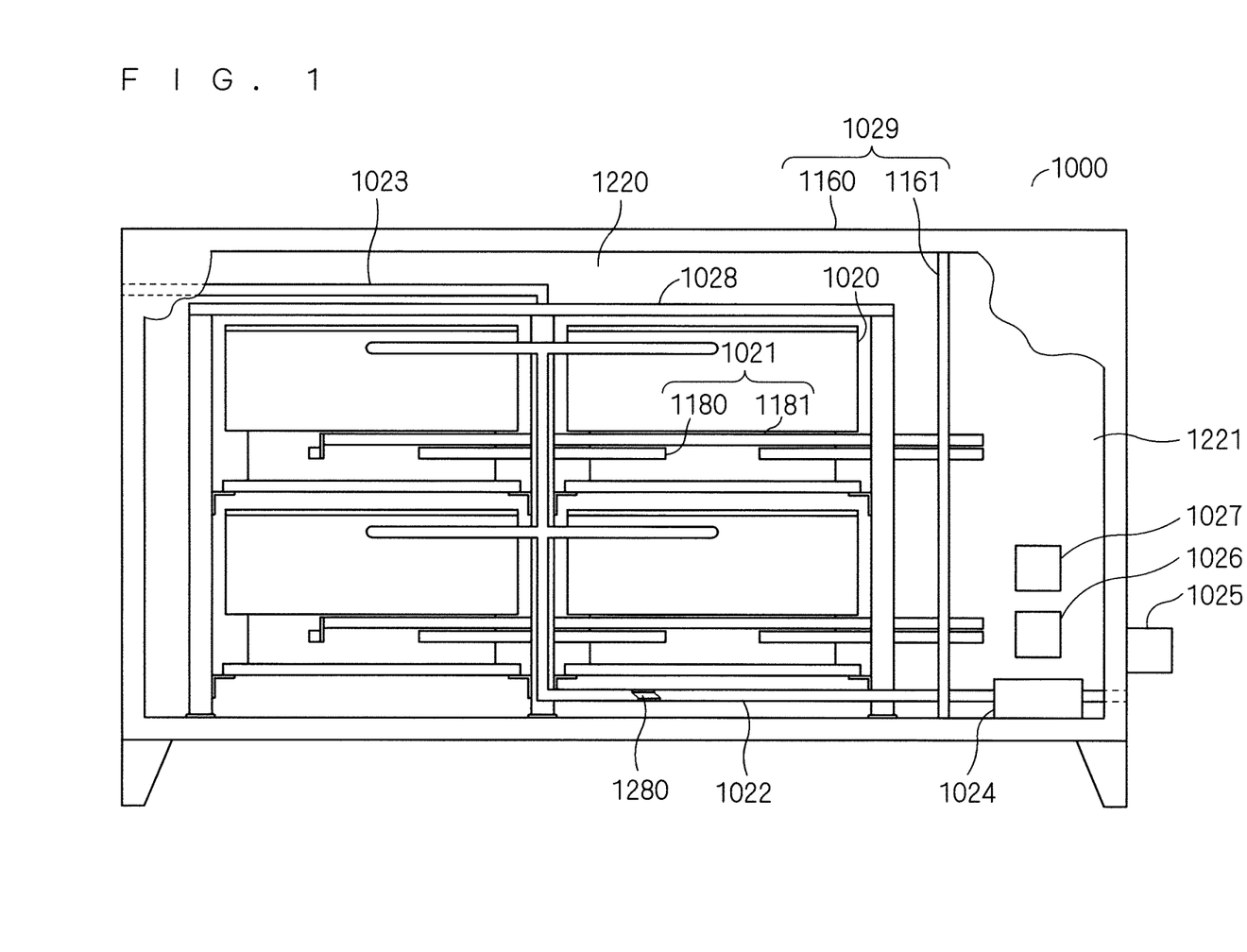
FIG. 1 is a front view of a power storage apparatus.
Figure 2:
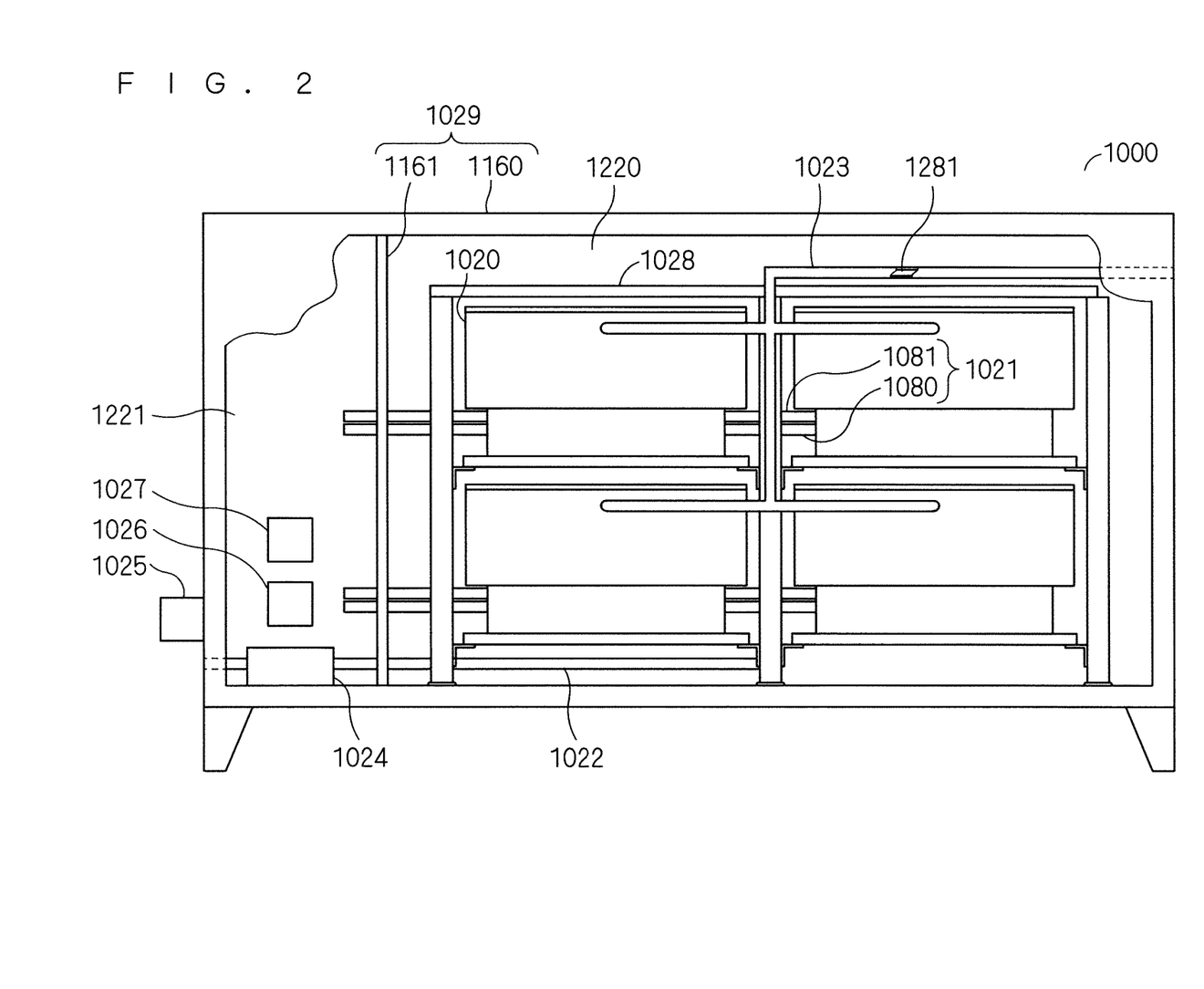
FIG. 2 is a rear view of power storage apparatus.
Figure 3:
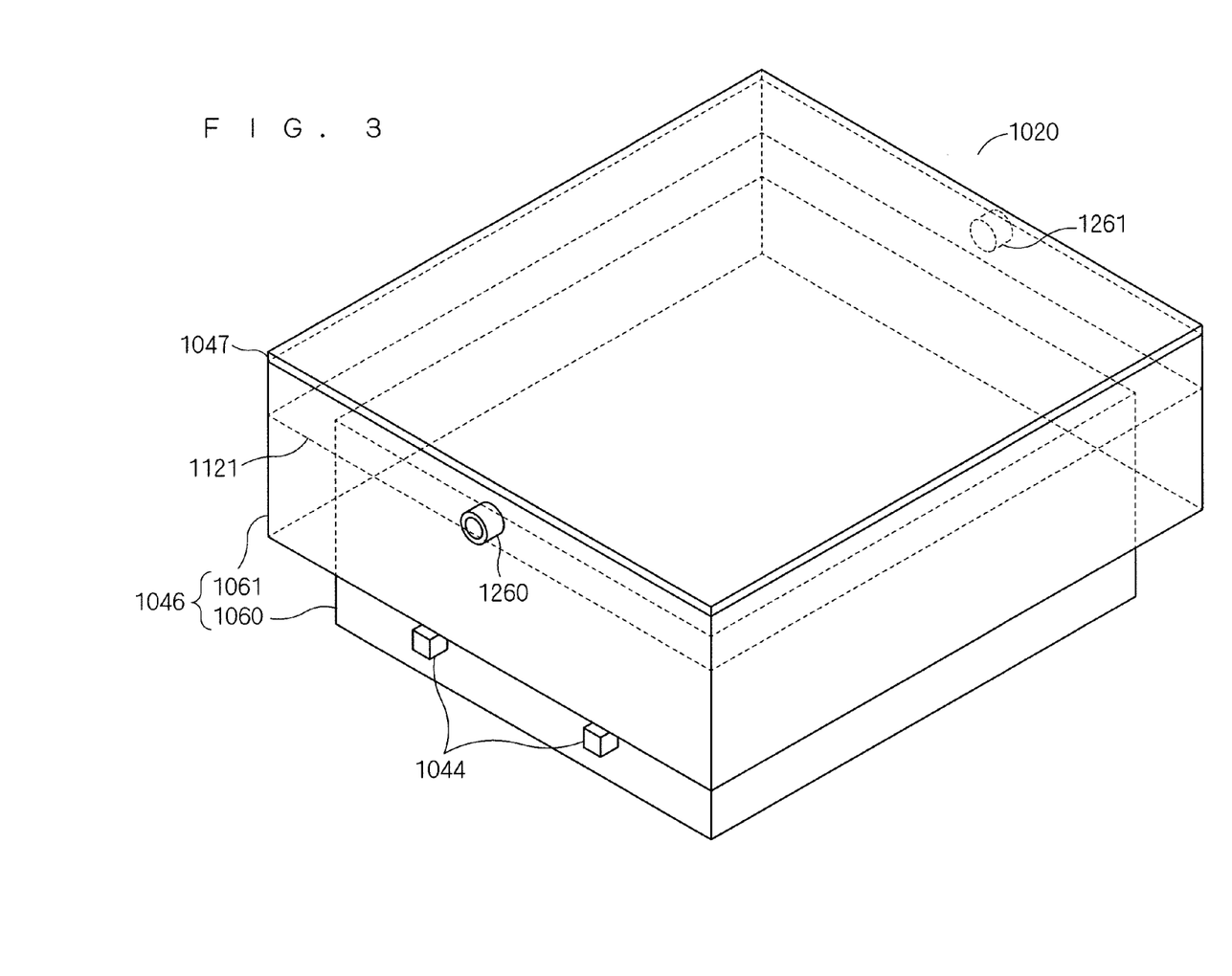
FIG. 3 is a perspective view of a battery module.
Figure 4:
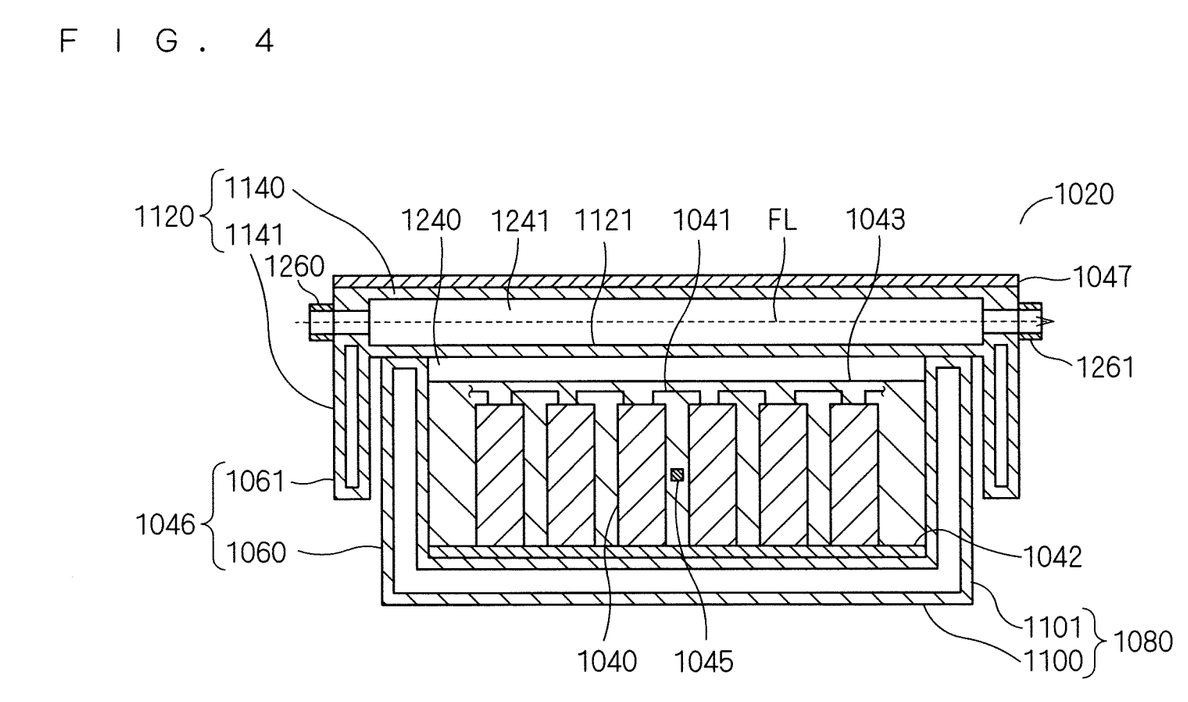
FIG. 4 is a sectional view of the battery module.
Figure 5:
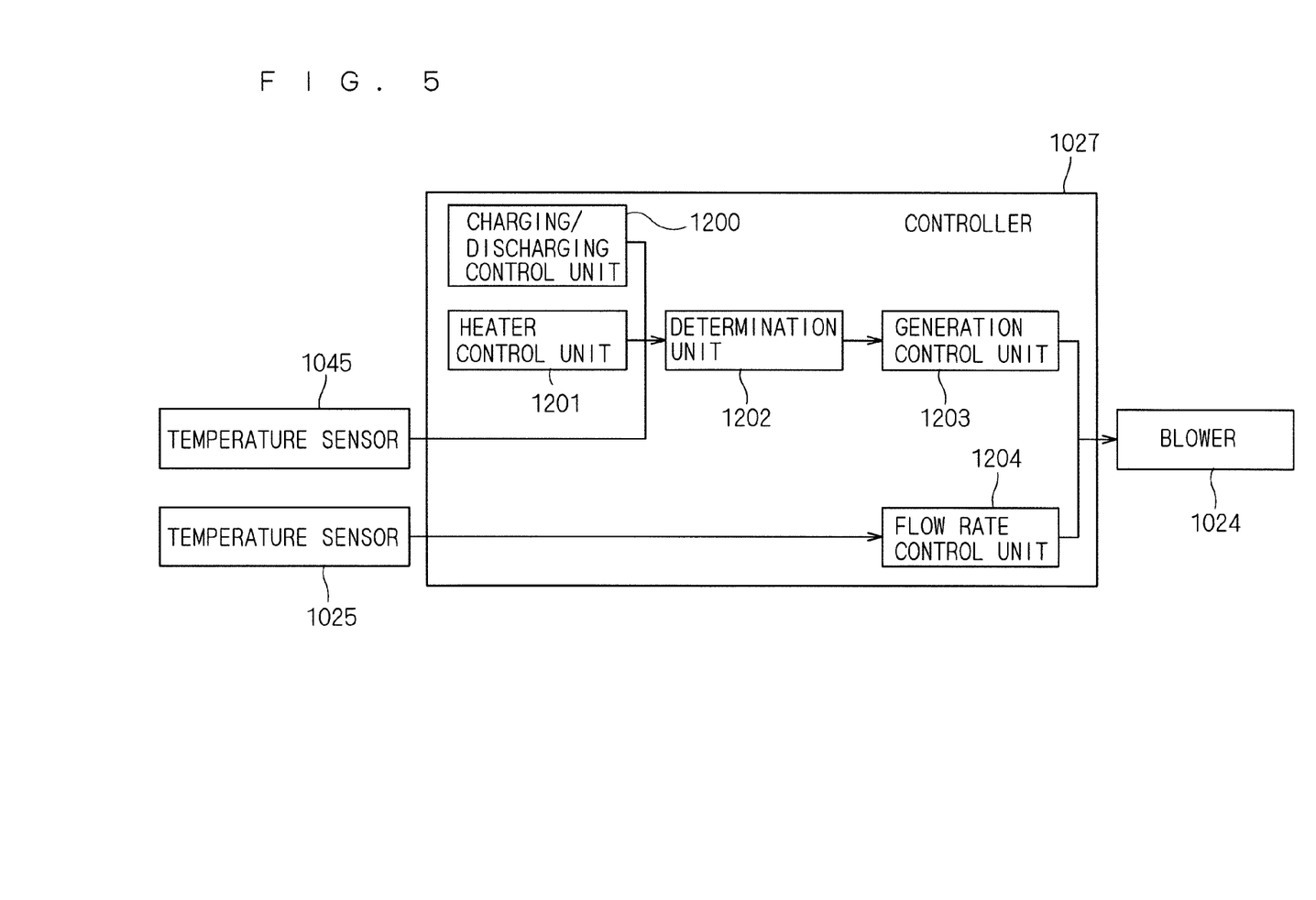
FIG. 5 is a block diagram of a controller.

Schematic diagrams in FIG. 1 and FIG. 2 show a preferred embodiment of a power storage apparatus. FIG. 1 is a front view. FIG. 2 is a rear view. Schematic diagrams in FIG. 3 and FIG. 4 show a module battery. FIG. 3 is a perspective view. FIG. 4 is a sectional view. A block diagram in FIG. 5 shows a controller, and the like. The power storage apparatus stores power in a sodium-sulfur battery (NaS battery). The power storage apparatus is preferably connected to an electric power system, and used for the adjustment of power supply/demand, prevention of power failure, and the like.

As shown in FIG. 1 and FIG. 2, a power storage apparatus 1000 includes module batteries 1020, bus bars 1021 outside the module batteries, an intake pipe 1022, an exhaust pipe 1023, a blower 1024, an external temperature sensor 1025, an accessory 1026, a controller 1027, a battery stand 1028, and a sealed container 1029.

The sealed container 1029 includes an outer wall 1160, and a partition wall 1161.

The bus bars 1021 outside the module batteries each include a wire 1180 that is arranged between the batteries and a wire 1181 that is not arranged between the batteries.

As shown in FIG. 3 and FIG. 4, each module battery 1020 includes electric cells 1040 of a NaS battery, bus bars 1041 inside the module battery, a heater 1042, sand 1043, module battery terminals 1044, an internal temperature sensor 1045, a heat-insulating container 1046, and a heat insulator 1047.

The heat-insulating container 1046 includes a box body 1060 and a lid body 1061.

The box body 1060 includes an outer wall 1080. The outer wall 1080 of the box body 1060 includes a bottom wall 1100, and side walls 1101.

The lid body 1061 includes an outer wall 1120 and a heat transfer wall 1121. The outer wall 1120 of the lid body 1061 includes a top wall 1140 and side walls 1141.

As shown in FIG. 5, the controller 1027 includes a charging/discharging control unit 1200, a heater control unit 1201, a determination unit 1202, a generation control unit 1203, and a flow rate control unit 1204.

A component other than these components may be added to the power storage apparatus 1000. A part of these components may be omitted from the power storage apparatus 1000. The number of the module batteries 1020 may be increased or decreased, and the number of the module batteries 1020 may be one. The number of the electric cells 1040 may be increased or decreased, and the number of the electric cells 1040 may be one.

(Partition of Inside of Sealed Container)

As shown in FIG. 1 and FIG. 2, a battery chamber 1220 and an accessory chamber 1221 are formed inside the sealed container 1029. A chamber other than the battery chamber 1220 and the accessory chamber 1221 may be formed inside the sealed container 1029. The two or more battery chambers 1220 may be formed inside the sealed container 1029. The two or more accessory chamber 1221 may be formed inside the sealed container 1029.

The battery chamber 1220 and the accessory chamber 1221 may be divided by the partition wall 1161. The partition wall 1161 hinders the circulation of air between the battery chamber 1220 and the accessory chamber 1221, and suppresses heat transfer from the battery chamber 1220 to the accessory chamber 1221. Consequently, even in a case where the temperature of the battery chamber 1220 rises, the temperature of the accessory chamber 1221 does not easily rise, and the temperature of the accessory chamber 1221 is appropriately maintained. However, also in a case where the partition wall 1161 is omitted, and the accessory chamber 1221 partitioned from the battery chamber 1220 is not formed, the effect of exhausting heat by an air flow FL described later is maintained. The partition wall 1161 may have a heat insulated structure such as a vacuum heat insulated structure.

(Partition of Inside of Heat-Insulating Container)

As shown in FIG. 3 and FIG. 4, an electric cell chamber 1240 and an air chamber 1241 are formed inside the heat-insulating container 1046. A chamber other than the electric cell chamber 1240 and the air chamber 1241 may be formed inside the heat-insulating container 1046. The two or more electric cell chambers 1240 may be formed inside the heat-insulating container 1046. The two or more air chambers 1241 may be formed inside the heat-insulating container 1046.

The electric cell chamber 1240 and the air chamber 1241 are divided by the heat transfer wall 1121. The heat transfer wall 1121 hinders the circulation of air between the electric cell chamber 1240 and the air chamber 1241, but transfers heat from the electric cell chamber 1240 to the air chamber 1241 well. Consequently, the entering of outside air into the electric cell chamber 1240 is suppressed, while heat is exhausted from the electric cell chamber 1240 to the air chamber 1241. The heat exhausted to the air chamber 1241 is exhausted outside the sealed container 1029 by the air flow FL. The heat transfer wall 1121 may be a flat plate, or fins may be formed on both sides or one side of the principal surface of the heat transfer wall 1121. In a case where the air flow FL is not present, the air chamber 1241 serves as a preferable heat insulating layer, and suppresses heat radiation to the outside.

The electric cell chamber 1240 is preferably formed in the box body 1060, the heat transfer wall 1121 is preferably provided in the lid body 1061, and the air chamber 1241 is preferably formed in the lid body 1061. Consequently, compared to a case where the air chamber 1241 is formed in the box body 1060, a load applied to the air chamber 1241 is reduced, and the strength of the module batteries 1020 is improved. However, also in a case where the heat transfer wall 1121 is provided in the box body 1060, and the air chamber 1241 is formed in the box body 1060, the effect of exhausting heat by the air flow FL is maintained.

The air chamber 1241 is preferably formed along the top wall 1140 of the lid body 1061. The air chamber 1241 is a space provided between the top wall 1140 of the lid body 1061 and the heat transfer wall 1121, and is surrounded by the top wall 1140 of the lid body 1061, parts, closer to the top wall 1140, of the side walls 1141 of the lid body 1061, and the heat transfer wall 1121. However, also in a case where the air chamber 1241 is formed along other wall, the effect of exhausting heat by the air flow FL is maintained.

(Arrangement of Components)

As shown in FIG. 1 and FIG. 2, the module batteries 1020, the wires 1180 that are arranged between the batteries, and the battery stand 1028 are housed in the battery chamber 1220. The blower 1024, the accessory 1026, and the controller 1027 are housed in the accessory chamber 1221. The wires 1181 that are not arranged between the batteries are housed so as to pass through the partition wall 1161 and extend between the battery chamber 1220 and the accessory chamber 1221. A principal part of the intake pipe 1022 is housed so as to pass through the partition wall 1161 and extend between the battery chamber 1220 and the accessory chamber 1221. A principal part of an exhaust pipe 1023 is housed in the battery chamber 1220.

Among the components housed inside the sealed container 1029, components whose allowable upper limit temperatures are relatively high, such as the module batteries 1020, are housed in the battery chamber 1220, and components whose allowable upper limit temperatures are relatively low, such as the accessory 1026, are housed in the accessory chamber 1221. The examples of the accessory 1026 include, for example, a cable, a terminal stand, a measurement device, and the like.

The module batteries 1020 are placed on the battery stand 1028. The module batteries 1020 may be housed in a structure which is not generally referred to "stand". The module batteries 1020 are separated from each other, and separated from the outer wall 1160 and the partition wall 1161 of the sealed container 1029.

The external temperature sensor 1025 is arranged outside the sealed container 1029.

As shown in FIG. 3 and FIG. 4, the electric cells 1040, the bus bars 1041 inside the module battery, the heater 1042, the sand 1043, and the internal temperature sensor 1045 are housed in the electric cell chamber 1240. The module battery terminals 1044 pass through the outer wall 1080 of the box body 1060 to extend between the electric cell chamber 1240 and the outside of the heat-insulating container 1046. The air chamber 1241 is preferably a space where only air flows. At least an electric device is not housed in the air chamber 1241.

The electric cells 1040 are buried in the sand 1043. The electric cells 1040 are separated from each other.

The heater 1042 is preferably installed along the outer wall 1080 of the box body 1060, and more preferably installed along the bottom wall 1100 of the box body 1060.

As shown in FIG. 3 and FIG. 4, the two or more electric cells 1040 are arranged in a direction parallel to the air chamber 1241. Consequently, the heat of the two or more electric cells 1040 are uniformly radiated, and dispersion in the two or more electric cells 1040 is not easily caused. However, the number of the electric cells 1040 may be one, or the two or more electric cells 1040 may be arranged in a direction different from the direction parallel to the air chamber 1241.

(Exhaust of Heat)

As shown in FIG. 3 and FIG. 4, an intake port 1260 and an exhaust port 1261 are formed on the outer wall 1120 of the lid body 1061. The intake port 1260 and the exhaust port 1261 are connected to the air chamber 1241. In a case where the air chamber 1241 is formed in the box body 1060, the intake port 1260 and the exhaust port 1261 are formed on the outer wall 1080 of the box body 1060.

As shown in FIG. 1 and FIG. 2, the intake pipe 1022 is formed with an intake path 1280. The exhaust pipe 1023 is formed with an exhaust path 1281. The intake pipe 1022 and the exhaust pipe 1023 each may be replaced with a structure which is generally referred to as "pipe". For example, the intake pipe 1022 may be replaced with a structure in which the intake path 1280 is formed in a solid body. The exhaust pipe 1023 may be replaced with a structure in which the exhaust path 1281 is formed in a solid body.

One end of the intake path 1280 is connected to the intake port 1260, and the other end of the intake path 1280 is exposed outside the sealed container 1029. The intake path 1280 starts from the outside of the sealed container 1029 and leads to the air chamber 1241. One end of the exhaust path 1281 is connected to the exhaust port 1261, and the other end of the exhaust path 1281 is exposed outside the sealed container 1029. The exhaust path 1281 starts from the air chamber 1241 and leads to the outside of the sealed container 1029. Consequently, a path of the air flow FL that starts from the outside of the sealed container 1029 and leads to the outside of the sealed container 1029 via the air chamber 1241 is formed, so that air outside the sealed container 1029 (hereinafter referred to as "outside air") can flow in the air chamber 1241.

The blower 1024 generates the air flow FL which sequentially flows through the intake path 1280, the air chamber 1241, and the exhaust path 1281. Consequently, heat is exhausted from the air chamber 1241 to the outside of the sealed container 1029 by the air flow FL, and the electric cell chamber 1240 is cooled. Additionally, heat transfer from the inside of the heat-insulating container 1046 to the battery chamber 1220 is suppressed, the temperature of the battery chamber 1220 does not easily rise, and the temperature of the battery chamber 1220 is appropriately maintained. Furthermore, outside air does not easily enter a space other than the intake path 1280, the air chamber 1241, and the exhaust path 1281, and the influence of the outside air such as salt damage is suppressed. For example, the battery chamber 1220 is not easily corroded by the salt damage, or an insulation property in the battery chamber 1220 is not easily lowered.

The blower 1024 may be replaced with other type of air blower. For example, the blower 1024 may be replaced with a fan.

The blower 1024 is inserted into the intake path 1280. Consequently, the blower 1024 is not easily affected by heat. However, in place of the insertion of an air supplying mechanism such as the blower 1024 into the intake path 1280, an air absorbing mechanism such as a pump may be inserted into the exhaust path 1281.

The exhaust path 1281 starts from the exhaust port 1261 and leads to the outside of the sealed container 1029 without passing through the accessory chamber 1221. Consequently, heat transfer from the exhaust path 1281 to the accessory chamber 1221 is suppressed. The temperature of the accessory chamber 1221 does not easily rise, and the temperature of the accessory chamber 1221 is appropriately maintained.

In a case where the two or more module batteries 1020 are charged/discharged in synchronization, in all of the two or more module batteries 1020, the temperatures of the electric cell chambers 1240 are the same level. Therefore, the timing of generating the air flow FL may not be independent for each of the module batteries 1020, and the single blower 1024 that is common in the two or more module batteries 1020 is simply prepared. However, a single blower 1024 may be prepared for each of the two or more module batteries 1020, and the timing of generating the air flow FL may be dependent for each of the module batteries 1020.

(Heat-Insulating Container)

As shown in FIG. 3 and FIG. 4, the heat-insulating container 1046 has a structure in which an opening of the box body 1060 is covered with the lid body 1061, and the electric cell chamber 1240 is closed by the heat transfer wall 1121. According to this structure, the electric cells 1040 and the like are easily housed in the electric cell chamber 1240, and heat is easily transferred from the electric cell chamber 1240 to the air chamber 1241. However, the heat-insulating container 1046 may have other structure. The heat-insulating container 1046 may have a structure in which the container is not separated into the box body 1060 and the lid body 1061.

The side walls 1141 of the lid body 1061, and the outer wall 1080 of the box body 1060 each have a vacuum heat insulated structure. Consequently, heat transfer from the inside of the heat-insulating container 1046 to the battery chamber 1220 is suppressed, and the rising of the temperature of the battery chamber 1220 is suppressed, and the temperature of the battery chamber 1220 is appropriately maintained. The side walls 1141 of the lid body 1061, and the outer wall 1080 of the box body 1060 each may have a heat insulated structure other than the vacuum heat insulated structure. For example, heat insulators may be buried in the side walls 1141 of the lid body 1061, and the outer wall 1080 of the box body 1060. The top wall 1140 of the lid body 1061 does not have the vacuum heat insulated structure. However, the top wall 1140 of the lid body 1061 may have the vacuum heat insulated structure.

(Heat Insulator)

As shown in FIG. 3 and FIG. 4, the heat insulator 1047 is mounted on the top wall 1140 of the lid body 1061. The heat insulator 1047 may be mounted on a part other than the top wall 1140 of the lid body 1061. For example, the heat insulator 1047 may be mounted on the side walls 1141 of the lid body 1061. The heat insulator 1047 faces the air chamber 1241 with the top wall 1140 of the lid body 1061 interposed therebetween. Consequently, heat transfer from the air chamber 1241 to the battery chamber 1220 is suppressed, and the temperature of the battery chamber 1220 does not easily rise, and the temperature of the battery chamber 1220 is appropriately maintained. However, also in a case where the heat insulator 1047 is omitted, the effect of exhausting heat by the air flow FL is maintained.

(Controller)

The controller 1027 is a computer in which a control program is installed. The controller 1027 executes the control program to control the component of the power storage apparatus 1000. One computer may serve as the function of the controller 1027, or two or more computers may serve as the function of the controller 1027. Hardware which does not include a control program may serve as a part of or all of the function of the controller 1027. The hardware is, for example, an electronic circuit that includes an operational amplifier, a comparator, and the like. The cooling control by the controller 1027 may be independent or may not be independent for each of the two or more module batteries 1020. A part of or all of the control by the controller 1027 may be replaced with the operation of an operator.

(Charging/Discharging Control Unit and Heater Control Unit)

The charging/discharging control unit 1200 controls charging to the module batteries 1020 and discharging from the module batteries 1020. The heater control unit 1201 controls the heater 1042.

(Determination Unit)

The determination unit 1202 determines whether or not the cooling of the electric cell chamber 1240 is required.

For example, in a case where the charging/discharging control unit 1200 performs charging/discharging, and the rising of the temperature of each electric cell chamber 1240, which is measured by the internal temperature sensor 1045, is a reference or more, the determination unit 1202 determines that the cooling of the electric cell chamber 1240 is required. Typically, in a case where the temperature of the electric cell chamber 1240 reaches a reference value (threshold value) or more, the determination unit 1202 determines that the rising of the temperature of the electric cell chamber 1240 is a reference or more. However, other factors such as the rising speed of the temperature of the electric cell chamber 1240, a charging/discharging current, and charging/discharging power may be considered. The temperature of the electric cell chamber 1240 is likely to rise, in a case where discharging from the module batteries 1020 is performed. Regardless of the fact whether charging/discharging is performed or not, the determination unit 1202 may determine that the cooling of the electric cell chamber 1240 is required, in a case where the rising of the temperature of the electric cell chamber 1240 is the reference or more.

For example, in a case where the heater control unit 1201 operates the heater 1042, the determination unit 1202 determines that the cooling of the electric cell chamber 1240 is not required.

(Generation Control Unit)

The generation control unit 1203 controls the blower 1024 on the basis of a determination result by the determination unit 1202. In a case where the cooling is required, the generation control unit 1203 operates the blower 1024 and generates the air flow FL. In a case where the cooling is not required, the generation control unit 1203 does not operate the blower 1024 and does not generate the air flow FL. In a case where the air flow FL is generated, heat is exhausted from the electric cell chamber 1240 to the outside of the sealed container 1029 by the air flow FL, and the electric cell chamber 1240 is cooled. In a case where the air flow FL is not generated, heat is not easily exhausted from the electric cell chamber 1240, and the thermal insulation property of the heat-insulating container 1046 is improved.

Consequently, in a case where the cooling of the electric cell chamber 1240 is required, the electric cell chamber 1240 is cooled. In a case where the cooling of the electric cell chamber 1240 is not required, the thermal insulation property of the heat-insulating container 1046 is improved, and the temperature of the electric cell chamber 1240 is appropriately maintained. In a case where the heater 1042 is operated, the electric cell chamber 1240 is not cooled, the power consumption of the heater 1042 is thus reduced, and the power loss of the power storage apparatus 1000 is reduced.

The flow rate control unit 1204 controls the blower 1024 such that the flow rate of the air flow FL is increased as the temperature of outside air measured by the external temperature sensor 1025 rises. Consequently, even in a case where the temperature of the outside air is high, the exhaust capacity of heat from the electric cell chamber 1240 to the outside of the sealed container 1029 is maintained, and the temperature of the electric cell chamber 1240 is appropriately maintained. However, also in a case where the flow rate of the air flow FL is constant, the effect of exhausting heat by the air flow FL is maintained. The intermittent operation of the blower 1024 may be performed, and the ratio of time during which the blower 1024 is operated may be increased as the temperature of the outside air rises.

(Charging/Discharging Path)

As shown in FIG. 1 and FIG. 2, the bus bars 1021 outside the module batteries serve as the charging/discharging paths of the module batteries 1020 inside the sealed container 1029. The bus bars 1041 inside the module batteries serve as the charging/discharging paths of the electric cells 1040 inside the module batteries 1020. The bus bars 1021 and 1041 are electrically connected to each other via the module battery terminals 1044. The module battery terminals 1044 may be omitted, and the bus bars 1021 and 1041 may be directly connected to each other.

The bus bars 1021 and 1041 are each configured from a conductor such as copper and aluminum. The bus bars 1021 and 1041 each are a bar-shaped body having a rectangular sectional shape. The bus bars 1021 and 1041 each are a bare wire line that is not coated by insulated coating. In a case where the bus bars 1021 and 1041 are not coated by the insulated coating, the heat resisting properties of the bus bars 1021 and 1041 are improved, but the bus bars 1021 and 1041 are easily affected by outside air such as salt damage. However, in the power storage apparatus 1000, outside air does not easily enter the battery chamber 1220 and the accessory chamber 1221 that house the bus bars 1021 outside the module batteries therein, and outside air does not easily enter the electric cell chambers 1240 that house the bus bars 1041 inside the module batteries. Therefore, a large problem does not occur also in a case where the bus bars 1021 and 1041 are easily affected by outside air such as salt damage. Additionally, the temperature of the battery chamber 1220 can be reduced to an allowable temperature of the insulated coating or less by using this cooling method, and therefore the bus bars 1021 and 1041 may be coated by the insulated coating, or may be replaced with other type of wiring materials.

(Sealing Property of Sealed Container)

The sealed container 1029 is a sealed container that has a sealing property enough to hinder the entering of outside air which affects an object housed inside the sealed container 1029. A sealing property with a degree required to a vacuum container is not required to the sealed container 1029.

According to the power storage apparatus 1000, a maintenance cost for countermeasures against salt damage is not increased.

Although the present invention has been described in detail, the aforementioned description is merely exemplification and not limitation in all aspects. Therefore, it is understood that numberless corrections and modifications can be devised without departing the scope of the present invention.

EXPLANATION OF REFERENCE

1000 power storage apparatus
1020 module battery
1021 bus bar outside module battery
1022 intake pipe
1023 exhaust pipe
1024 blower
1025 external temperature sensor
1026 accessory 1027 controller
1029 sealed container
1040 electric cell
1041 bus bar inside module battery
1045 internal temperature sensor
1046 heat-insulating container
1047 heat insulator

The invention claimed is:

1. A power storage apparatus comprising:
a battery that includes a container, an electric cell of a sodium-sulfur battery, and a charging/discharging path inside the battery, said container including an outer wall and a heat transfer wall, an electric cell chamber and an air chamber being formed inside said container, said heat transfer wall dividing said electric cell chamber and said air chamber, and said electric cell and said charging/discharging path inside the battery being housed in said electric cell chamber;
a charging/discharging path outside the battery that is electrically connected to said charging/discharging path inside the battery;
a sealed container, which is a separate container from the container that houses said battery and said charging/discharging path outside the battery, a battery chamber and an accessory chamber being formed inside said sealed container, and said battery being housed in said battery chamber, wherein said sealed container includes a partition wall that divides said battery chamber and said accessory chamber, hinders the circulation of air between said battery chamber and said accessory chamber, and suppresses heat transfer from said battery chamber to the accessory chamber;
an intake path formation that is formed with an intake path which starts from outside of said sealed container and leads to said air chamber;
an exhaust path formation that is formed with an exhaust path which starts from said air chamber and leads to outside of said sealed container;
a generation mechanism that generates an air flow which sequentially flows through said intake path, said air chamber, and said exhaust path;
a determination unit that determines whether or not cooling of said electric cell chamber is required;
a generation control unit that controls said generation mechanism such that said air flow is generated in a case where said determination unit determines that the cooling of said electric cell chamber is required, and said air flow is not generated in a case where said determination unit determines that the cooling of said electric cell chamber is not required; and
an accessory that is housed in said accessory chamber.

2. The power storage apparatus according to claim 1, wherein
said battery further includes a first temperature sensor that is housed in said electric cell chamber, and
said determination unit determines that the cooling of said electric cell chamber is required, in a case where rising of a temperature measured by said first temperature sensor is equal to or greater than a reference.

3. The power storage apparatus according to claim 2, further comprising:
a second temperature sensor that is arranged outside said sealed container; and
a flow rate control unit that controls said generation mechanism such that a flow rate of said air flow is increased as a temperature measured by said second temperature sensor rises.

4. The power storage apparatus according to claim 1, further comprising:
a heat insulator external to said air chamber with said outer wall interposed therebetween.

5. The power storage apparatus according to claim 1, wherein said exhaust path does not pass through said accessory chamber.

6. The power storage apparatus according to claim 1, wherein said battery includes two or more electric cells including said electric cell, wherein said two or more electric cells are housed in said electric cell chamber and are arranged in a direction parallel to said air chamber.

7. A method of operating a power storage apparatus comprising the steps of:
(a) preparing a power storage apparatus including a battery, a charging/discharging path outside the battery, a sealed container, an intake path formation, an exhaust path formation, a generation mechanism and an accessory, said battery including a container, an electric cell of a sodium-sulfur battery, and a charging/discharging path inside the battery, said container including an outer wall and a heat transfer wall, an electric cell chamber and an air chamber being formed inside said container, said heat transfer wall dividing said electric cell chamber and said air chamber, and said electric cell and said charging/discharging path inside the battery being housed in said electric cell chamber, said charging/discharging path outside the battery and said charging/discharging path inside the battery being electrically connected to each other; said sealed container, which is a separate container from the container housing said battery and said charging/discharging path outside the battery; a battery chamber and an accessory chamber being formed inside said sealed container, said battery being housed in said battery chamber, and said accessory being housed in said accessory chamber, an intake path which starts from outside of said sealed container and leads to said air chamber being formed in said intake path formation; an exhaust path which starts from said air chamber and leads to outside of said sealed container being formed in said exhaust path formation; and said generation mechanism generating an air flow which sequentially flows through said intake path, said air chamber, and said exhaust path, wherein said sealed container includes a partition wall that divides said battery chamber and said accessory chamber, hinders the circulation of air between said battery chamber and said accessory chamber, and suppresses heat transfer from said battery chamber to the accessory chamber;
(b) determining whether or not cooling of said electric cell chamber is required; and
(c) controlling said generation mechanism such that said air flow is generated in a case where it is determined that the cooling of said electric cell chamber is required, and said air flow is not generated in a case where it is determined that the cooling of said electric cell chamber is not required.

* * * * *